F. JORDAN.
PROCESS FOR WELDING ALUMINIUM.
APPLICATION FILED MAR. 9, 1911.
1,033,412.
Patented July 23, 1912.
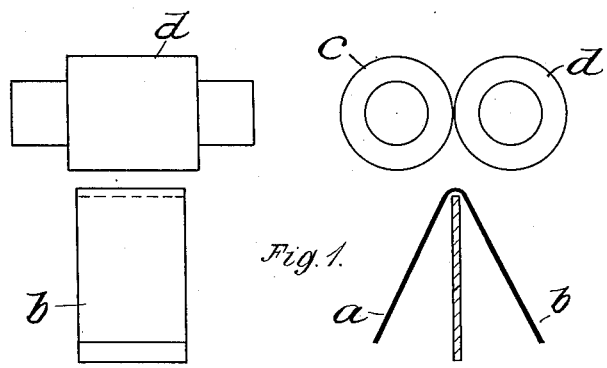
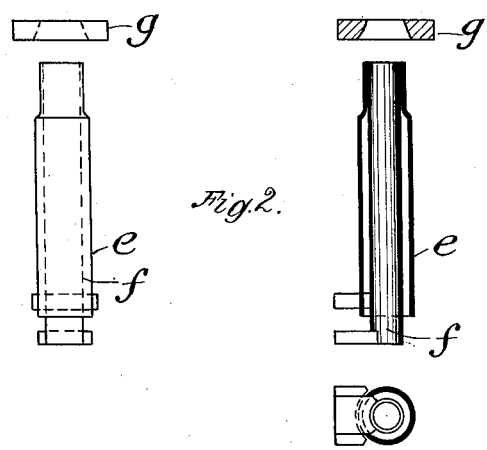
Witnesses:
Elsa Haupt
Dora Utech
Inventor:
Franz Jordan

UNITED STATES PATENT OFFICE.

FRANZ JORDAN, OF REINICKENDORF, GERMANY.

PROCESS FOR WELDING ALUMINIUM.

1,033,412.   Specification of Letters Patent.   Patented July 23, 1912.

Application filed March 9, 1911. Serial No. 613,355.

*To all whom it may concern:*

Be it known that I, FRANZ JORDAN, a subject of the Emperor of Germany, residing at Reinickendorf, in the Kingdom of Prussia, German Empire, have invented certain new and useful Improvements in Processes for Welding Aluminium; and I do hereby declare the following to be a full, clear, and exact description of the invention, such as will enable others skilled in the art to which it appertains to make and use the same.

According to a known method for welding aluminium under pressure to other metals the melting point of which is higher than that of aluminium, the latter is hermetically packed with the other metal for preventing oxidization, and then heated to the welding heat of aluminium, about 550 to 600° C., and the two are then welded together under pressure, say by rolling, drawing, hammering, pressing and the like. In some instances the second metal is rubbed with aluminium so as to produce a better welding. According to another method the welding is produced in several operations, with the object of avoiding all noxious oxidization. The aluminium is heated, to not more than 400° C., and brought under pressure into close contact with the other metal, then heated together with the latter to the welding heat of aluminium (about 600° C.) and at such heat welded under pressure. It is further known to weld a metal of a high melting point with another metal of a low melting point, by heating the former to welding heat and then uniting both metals under pressure and at one operation, the metals being until then kept from coming in contact with each other. In carrying out this method a detrimental oxidization of the highly heated metal before welding will have to be reckoned with.

The new method has the object to enable the welding operation being carried out at one operation, without need of the exclusion of the air and with the absence of all detrimental oxidization.

In the accompanying drawing Figure 1 shows the arrangement for uniting plates, Fig. 2 shows the arrangement for uniting tubes, bars and wires.

The present method is based on the fact, that aluminium when heated to almost a welding heat will under access of air, show no oxidization which would prevent the welding, therefore remains weldable under pressure in this condition with other not so highly heated metals which will therefore not oxidize under access of the air, even if the melting point of these metals should be higher than that of aluminium.

Aluminium is heated in a furnace to its welding heat or the maximum temperature admitting of its still being worked under pressure. In a second furnace the metal of a higher melting point, to be welded to the aluminium, is heated so far only, that it will certainly not oxidize under access of air. In this condition the metals are united: 1. If in form of plates $a$, $b$, Fig. 1 they are placed, as shown in Fig. 1 in such a manner between the rollers $c$, $d$, that the plating metal $b$ encompasses the metal to be plated $a$ in form of an angle, so that the metallic surfaces to be united will for the purpose of avoiding a detrimental oxidization come into contact with each other only at the moment of the welding operation performed under pressure. 2. If in form of wires, bars, tubes, $e$, $f$, as shown in Fig. 2 they are placed in such a manner between the rollers or into the drawing dies $g$, that the plating metal will surround the wires, bars, tubes or the like in form of sleeve of a comparatively large diameter, without coming in contact therewith and is so welded thereto at one single operation. The method may be employed in the same manner for welding aluminium to metal alloys, the melting point of which is higher than that of aluminium, as also for welding aluminium alloys, which show the same properties as aluminium, with other metals or alloys of a higher melting point.

I claim:

A method for uniting aluminium with metals or metal alloys of a melting point above the welding heat of aluminium, by compression in a heated condition, wherein the aluminium is heated to welding heat, the metal of a higher melting point being heated, only so far, that its oxidization under access of air is still safely avoided both metals being then protected against a premature contact, and united under pressure at one operation.

In testimony whereof I affix my signature in presence of two witnesses.

FRANZ JORDAN.

Witnesses:
HENRY HASPER,
WOLDEMAR HAUPT.